(12) United States Patent
Das

(10) Patent No.: US 10,532,726 B2
(45) Date of Patent: Jan. 14, 2020

(54) METHOD FOR DECELERATING A VEHICLE MOVING AT LOW SPEED

(71) Applicant: FORD GLOBAL TECHNOLOGIES, LLC, Dearborn, MI (US)

(72) Inventor: Ashrit Das, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 162 days.

(21) Appl. No.: 15/927,526

(22) Filed: Mar. 21, 2018

(65) Prior Publication Data

US 2018/0273017 A1   Sep. 27, 2018

(30) Foreign Application Priority Data

Mar. 21, 2017 (DE) .......................... 10 2017 204 639

(51) Int. Cl.
*B60W 10/18* (2012.01)
*B60T 8/171* (2006.01)
*B60W 30/18* (2012.01)

(52) U.S. Cl.
CPC ............ *B60W 10/18* (2013.01); *B60T 8/171* (2013.01); *B60W 30/18063* (2013.01); *B60W 30/18109* (2013.01); *B60W 2422/70* (2013.01); *B60W 2720/10* (2013.01)

(58) Field of Classification Search
CPC .................................................. B60W 10/18
See application file for complete search history.

(56) References Cited

U.S. PATENT DOCUMENTS

| 6,226,593 | B1 | 5/2001 | Kurz et al. | |
| 6,385,527 | B1 | 5/2002 | Zumberge et al. | |
| 6,626,257 | B2 * | 9/2003 | Kurz ...................... | B60K 28/16 180/169 |
| 7,035,727 | B2 * | 4/2006 | De La Salle .......... | B60K 6/485 701/93 |
| 7,988,593 | B2 * | 8/2011 | Staub .................... | B60W 20/10 477/3 |

(Continued)

FOREIGN PATENT DOCUMENTS

| EP | 0927671 B1 | 7/1999 |
| JP | 2000278815 A | 10/2000 |

(Continued)

OTHER PUBLICATIONS

DE Examination Report for DE 10 2017 204 639.2 dated Nov. 14, 2017, 7 pages.

*Primary Examiner* — Alex C Dunn
(74) *Attorney, Agent, or Firm* — Frank MacKenzie; Brooks Kushman P.C.

(57) ABSTRACT

The invention relates to a method for decelerating a vehicle (10) moving at low speed (vV), in particular by using a hydraulically or pneumatically operated braking system (26), with the following steps: determining, by means of the speed sensor (32), whether the speed (vV) of the vehicle (10) falls short of a predeterminable first limiting value (vC1); if the speed (vV) of the vehicle (10) falls short of the first limiting value, increasing the propulsion torque (MA) transmitted to the drive train (18); and decelerating the vehicle (10) by increasing the braking torque (MB) acting on the wheels (20) by means of the controller (36).

17 Claims, 2 Drawing Sheets

(56) References Cited

U.S. PATENT DOCUMENTS

| | | | |
|---|---|---|---|
| 8,761,980 B2* | 6/2014 | Kimoto | B60W 10/08 |
| | | | 180/315 |
| 9,308,831 B2* | 4/2016 | Monsere | B60L 15/2045 |
| 2008/0115993 A1 | 5/2008 | Roudeau et al. | |
| 2016/0101700 A1* | 4/2016 | Brown | B60L 7/26 |
| | | | 701/22 |
| 2017/0297575 A1 | 10/2017 | Das et al. | |
| 2018/0065629 A1* | 3/2018 | Wolff | B60L 58/12 |

FOREIGN PATENT DOCUMENTS

| | | |
|---|---|---|
| JP | 2004032826 A | 1/2004 |
| WO | 2015176876 A1 | 11/2015 |

* cited by examiner

METHOD FOR DECELERATING A VEHICLE MOVING AT LOW SPEED

CROSS-REFERENCE TO RELATED APPLICATIONS

This application claims foreign priority benefits under 35 U.S.C. § 119(a)-(d) to DE Application 10 2017 204 639.2 filed Mar. 21, 2017, which is hereby incorporated by reference in its entirety.

TECHNICAL FIELD

The present invention relates to a method for decelerating a vehicle moving at low speed, in particular by using a hydraulically or pneumatically operated braking system.

BACKGROUND

Modern vehicles have braking systems which are operated autonomously or partly autonomously to decelerate the vehicle and to regulate the speed of the vehicle. Autonomously operated braking systems find application in vehicles driving autonomously, in which the driver has no possibility—or at most a very limited possibility—to influence the driving maneuvers executed by the vehicle. Braking systems that are operated partly autonomously can, in certain driving situations, initiate a braking maneuver without the driver having to become active for this purpose, even though he/she is sitting at the controls. Examples of such systems are adaptive cruise-control systems, in which by virtue of targeted braking interventions a certain spacing from the vehicle traveling ahead is not fallen short of. In the case of collision-avoidance systems a braking operation is initiated independently if an impact on an object—in particular with another vehicle—is predicted. Further applications of braking systems that are operated partly autonomously are traffic jam assistants, in which—up to a certain vehicle speed, particularly in a traffic jam—the driver must neither accelerate nor decelerate the vehicle. Moreover, in the case of parking assistants, which maneuver the vehicle independently into a parking space or into a garage, braking systems are actuated autonomously.

The vast majority of braking systems that are also employed in modern vehicles are operated hydraulically or pneumatically. Braking systems of such a type exhibit a relatively coarse dispersal of the pressure of the pressure medium, with the consequence that they can be operated only with a minimal braking torque which deviates more or less clearly from 0 Nm. Depending upon the braking system, the minimal braking torque amounts to between 30 Nm and 50 Nm. If a braking torque is required that lies below this braking torque, the braking system does not react. This results in the situation that a vehicle that is moving at a slow speed can be decelerated only relatively jerkily, since at least the minimal braking torque has to be used, even if a lower braking torque would suffice for the purpose of decelerating. In addition, the case may arise that the vehicle rolls for a certain time even though the control unit has initiated a braking operation, which from the point of view of safety is problematic.

Besides the losses of comfort, yet further disadvantages are associated with this: as already mentioned, the instantaneous speed of the vehicle plays a very important role for the braking operation and the required braking torque. The speed of the vehicle can be ascertained with an incremental encoder associated with one (or more) of the vehicle wheels, for instance. Such encoders produce a signal, or "tick," for each angular increment of wheel rotation (change of angle of the wheel) being monitored. The speed signals or ticks are passed on to a control unit which, in turn, activates the braking system in a manner depending on the ascertained speed of the vehicle.

In many cases the control unit of the vehicle in question uses a so-called PI controller (proportional-integral controller), which is composed of a proportional term and an integrating term. PI controllers are part of a linear control concept wherein the above-described property of hydraulically or pneumatically operated braking systems, namely of reacting only as from a certain brake pressure, represents an instability which can only be managed with difficulty with PI controllers, despite the integrating term.

Since in the case of the PI controller it is a question of a stable controller, at low speeds it may occur that the incremental encoder produces no speed signal for a certain time, even though the vehicle is moving, and the PI controller no longer has a command variable and does not know whether or not the vehicle is moving.

If, for instance, an autonomously moving vehicle is to be driven into a garage or into a parking space, as a result of this the situation may occur that the vehicle comes to a halt short of (before reaching) the stipulated stopping position (target position), even though it still has to be moved at a low speed in order to reach the target position. In this case the control unit releases the brakes, and the vehicle is accelerated, in order subsequently to be decelerated again with the minimal braking torque already mentioned above. By this means, an undesirable sequence of acceleration processes and braking processes occurs. This sequence of acceleration processes and braking processes may be intensified if the vehicle is accelerated by external influences such as a gust of wind or by reason of the gradient of the parking space.

A further point is that during the transition from relatively high to low vehicle speeds, which in the following are to be designated as creeping speed, the friction, in particular between the wheels of the vehicle and the ground, passes over from a dynamic behavior into a static behavior, as a result of which the dynamics of the vehicle change, further aggravating the regulation of the braking processes.

U.S. Pat. No. 7,035,727 B2 presents a method for regulating the speed of a vehicle when the vehicle is moving at the creeping speed. EP 0 927 671 B1 presents a method for braking a wheel of a vehicle. Further disclosures for regulating the speed of a vehicle and also for braking a vehicle are to be found in JP 2004 032 826 A, JP 2000 278 815 A, US 2008/0115993 A1, U.S. Pat. No. 6,385,527 B1 and WO 2015/176876 A1

SUMMARY

The present disclosure species a method for decelerating a vehicle moving at low speed, in particular by using a hydraulically or pneumatically operated braking system, with which the aforementioned disadvantages can be countered. In particular, the method is to enable a jolt-free deceleration to a complete stop and avoid the sequence of acceleration processes and braking processes.

One embodiment of the invention relates to a method for decelerating a vehicle moving at low speed, in particular by using a hydraulically or pneumatically operated braking system, wherein the vehicle comprises a number of wheels, an engine, a drive train interacting with the wheels, a torque converter arranged between the engine and the drive train, with which the torque provided by the engine can be entirely or partly transmitted to the drive train, wherein the drive train transmits the transmitted propulsion torque at least to some of the wheels, a braking system for decelerating at least some of the wheels with a braking torque, a speed sensor for determining the speed of the vehicle and for generating corresponding speed signals, and a control unit with which the propulsion torque transmitted to the drive train and also the braking torque acting on the wheels can be changed, taking the speed of the vehicle into consideration. The method as proposed comprises in this case the following steps:

determining, by means of the speed sensor, whether the speed of the vehicle falls short of a predeterminable limiting value, and if the speed of the vehicle falls short of a first limiting value, increasing the propulsion torque transmitted to the drive train, and decelerating the vehicle by increasing the braking torque acting on the wheels by means of the control unit.

The components that are needed for executing the method as proposed are ordinarily present in modern vehicles, so no changes to the configuration of the vehicle as such are necessary. In accordance with the proposal, the propulsion torque transmitted to the drive train is increased when the speed of the vehicle falls short of a first limiting value. The speed of the vehicle below the first limiting value may be designated as the "creeping speed" and may lie, for instance, within the range from 5 km/h to 7 km/h. Only when this condition has been satisfied does the control unit intervene, and the speed is regulated by the control unit according to the invention.

The propulsion torque can be increased by an appropriate activation of the engine and/or of the torque converter. As already mentioned in the introduction, hydraulically or pneumatically operated braking systems exhibit a relatively coarse dispersal of the pressure of the pressure medium, with the consequence that they can be operated only with a minimal braking torque which deviates more or less clearly from 0 Nm and may amount, for instance, to between 30 Nm and 50 Nm and frequently to about 40 Nm. By reason of the increased propulsion torque, an increased braking torque is consequently necessary in order to be able to decelerate the vehicle. The propulsion torque is increased so far that the braking torque needed for the purpose of decelerating lies above the minimal braking torque. By this means, it is ensured that the vehicle can be decelerated in jolt-free manner until it comes to a complete standstill. As a consequence of the increased braking torque, the vehicle is prevented from being able to move at a minimal speed, even though the speed sensor takes the standstill of the vehicle as its starting-point, and a jerky braking operation is initiated as soon as the vehicle has been accelerated so much that the speed sensor is able to generate a speed signal and communicate it to the control unit.

In an alternative embodiment, the vehicle may have a vehicle-position-finding system with which a target position of the vehicle can be defined and the actual position can be determined and compared. In addition, the control unit may have been configured in such a way that the propulsion torque transmitted to the drive train and also the braking torque acting on the wheels can be changed, taking the difference between the target position and the actual position of the vehicle into consideration. The method may in this case have the following step:

if the difference between the target position and the actual position of the vehicle falls below a predeterminable limiting value, complete decelerating of the vehicle by increasing the braking torque acting on the wheels by means of the control unit.

The vehicle-position-finding system may be a conventional navigation system which has a sufficient accuracy in order to be able to determine the actual position of the vehicle. Over and above this, spacing sensors, car-to-car communication systems or car-to-infrastructure communication systems may be employed for this purpose. In each case the vehicle-position-finding system must be capable of comparing a target position, which can be entered by the driver or can be determined or has been determined by the control unit, with an actual position. If a navigation system having a sufficient accuracy is employed, the driver can, for instance, enter a parking space reserved for him/her in the vicinity of the destination by way of target position. Target positions determined by the control unit can be determined in the following way: with the aid of spacing sensors, a vehicle can be maneuvered independently into a parking space or a garage. With a car-to-car communication system, speeds, accelerations and retardations and also spacings from other vehicles can be communicated, for instance in a traffic jam. By means of a car-to-infrastructure communication, the position of the vehicle with respect to a certain infrastructure device—for instance, a traffic signal, a grade crossing or a charging station for electric vehicles—can be determined.

In all cases, a target position can be established in which the vehicle is positioned optimally. In accordance with the proposal, a difference between the target position and the actual position is defined, which may also be designated as "distance to travel" (dtt). If this difference is fallen short of and the vehicle comes to a halt within this difference, the actual position then occupied by the vehicle can be accepted and does not have to be corrected. If, for instance, the target position at a traffic signal is reached when the front end of the side seal of the vehicle is in alignment with the stop-line, then an actual position can be accepted in which the front end of the vehicle comes to a halt, for instance, 20 cm to 40 cm and, in particular, 30 cm ahead of the stop-line. In accordance with the proposal, in this embodiment the control unit does not attempt to accelerate and decelerate the vehicle until such time as the target position has been reached. On the one hand, brief accelerations and retardations are prevented here which for the above reasons are executed jerkily and thereby impair comfort; on the other hand, energy is saved, and the components of the vehicle that are involved, in particular the engine and the braking system, are subjected to less wear.

In another embodiment of the method as proposed, the increase of the propulsion torque can be undertaken in a manner depending on the speed of the vehicle. For this purpose, a torque sensor for determining the propulsion torque transmitted from the torque converter to the drive train may be employed, for instance. The propulsion torque that is output by the drive train is, amongst other things, dependent on the speed of rotation of the drive train, on the speed of the vehicle, and on the geometry of the torque converter. If the vehicle is retarded in a given automatic gear and the wheels rotate more slowly, the speed of rotation of the drive train also falls. But the engine has to run at least at the idling speed, with the consequence that the propulsion torque transmitted from the torque converter to the drive train rises. To compensate for this effect, in this embodiment the increase of the propulsion torque is undertaken in a manner depending on the speed of the vehicle, presupposing that the speed of the vehicle is sufficiently high that the speed sensor is able to generate a speed signal. Therefore the propulsion torque is increased more intensely at higher speeds than at lower speeds, so that after the compensation approximately the same propulsion torque is transmitted to the drive train so long as the vehicle is moving at the creeping speed. This compensation can be effected by an appropriate activating of the engine and/or of the torque converter. The compensation can be implemented with the aid of values saved in tables, and can be chosen in such a way that the propulsion torque transmitted to the drive train after the compensation is big enough to overcome the drag losses of the drive train and the friction of the wheels on the ground, so that the vehicle moves at the creeping speed if the engine is turning at the idling speed.

The equalization of the propulsion torque with respect to the speed of the vehicle is—due to the above-described properties of hydraulically and/or pneumatically operated braking systems—easier to implement than a compensation of the braking torque. By reason of the compensation of the propulsion torque, the braking torque can be chosen in such a way that, on the one hand, it lies above the minimal braking torque of the braking system being used and, on the other hand, the braking torque is so big that the vehicle is decelerated in jolt-free manner but at the same time stops safely, even when external forces come into play, for instance from a gust of wind or from the gradient of the undersurface on which the vehicle comes to a halt.

In another embodiment, the increase of the propulsion torque is undertaken by means of a compensation factor. One solution that may present itself is to compensate for the dependence, described above, of the propulsion torque transmitted to the drive train on the speed of the vehicle in such a way that the compensated propulsion torque transmitted to the drive train is speed-independent so long as the vehicle is moving at the creeping speed. The compensation may be effected proportionately, for which purpose the compensation factor amounts to less than 1, for instance between 0.6 and 0.8 and in particular 0.7. If a complete compensation is being striven for, overcompensations may occur, as a result of which oscillations may be brought about, and the vehicle can no longer be decelerated in jolt-free manner.

In another embodiment, the control unit may include a PI controller, and the method may have the following step:

if the difference between the target position and the actual position of the vehicle falls below a predeterminable limiting value and the speed sensor communicates no speed signals to the control unit for a certain time, setting of a speed-error input value for the integrating term to 1 by means of the control unit.

The PI controller can take over the regulation of the speed of the vehicle completely if said speed falls below the creeping speed. The integrating component of the PI controller is deliberately manipulated in order to prevent the vehicle from being accelerated and decelerated over and over again in order to reach the target position in the case where the difference between the target position and the actual position of the vehicle falls below a predeterminable limiting value, for instance between 20 cm and 40 cm and in particular 30 cm. In this case the speed can additionally be adjusted to a certain value, for instance to 1 km/h, by means of the control unit. On the one hand, brief accelerations and retardations are prevented here which for the above reasons are executed jerkily and thereby impair comfort; on the other hand, energy is saved and the components of the vehicle that are involved, in particular the engine and the braking system, are conserved.

One embodiment of the method is distinguished by the following step:

if the speed of the vehicle falls short of a second limiting value and there is no requirement for increasing the propulsion torque, increasing the braking torque by means of the control unit.

Typically, the second limiting value of the speed is lower than the first limiting value. The first limiting value of the speed may be, for instance, the creeping speed, which may amount to between 5 km/h and 7 km/h. The second limiting value is distinctly lower than the creeping speed and amounts, for instance, to between 0.6 km/h and 0.8 km/h, in particular 0.7 km/h. The increase of the braking torque ensures that the braking torque is sufficiently high in order to decelerate the vehicle completely and to keep it safely decelerated.

In another embodiment, the method includes the following step:

increasing the braking torque by a certain value for each speed signal registered by the control unit.

For instance, for each registered speed signal a value of −300 may be added to the input signal of the integrating term. The negative value declares that in this case it is a question of a retardation. Improbable situations may occur, in which the stationary vehicle signal assumes the value 1 and the integrating term is given the value 0 as input signal, so that this value retains the current value, even though the vehicle is moving. If the vehicle is moving slowly enough, the stationary vehicle signal retains the value 1. If the speed of the vehicle rises, the value of the stationary vehicle signal falls and the integrating term assumes higher values. Even if the vehicle is moved by external influences, for instance by gusts of wind or by a gradient of the parking area, by the adding of the value of −300 it is ensured that the braking torque is sufficiently high in order to decelerate the vehicle to a complete stop and to keep it stopped. If the speed of the vehicle rises to values above 0.2 km/h, the PI controller also reacts again.

According to a further developed embodiment, the method includes the following step:

using a set speed value for regulating the speed of the vehicle, said value resulting from the quotient of the difference between the target position and the actual position of the vehicle and a scaling factor.

The use of a set speed value for regulating the speed of the vehicle has advantages in terms of control engineering. The difference between the target position and the actual position of the vehicle is updated continuously as soon as the vehicle moves. The set speed value may also assume negative values if the vehicle has traveled "too far" and must be reversed in order to occupy the target position. The set speed value can be chosen in such a way that it assumes a maximal value if the vehicle is moving at the creeping speed, and becomes 0 if the vehicle is stationary. The scaling factor may, for instance, assume values from 0.2 to 0.4 and in particular 0.3. By this means, a correlation between the difference between the target position and the actual position of the vehicle and the set speed value is created as soon as the vehicle is moving at the creeping speed. Since the scaling factor remains unchanged, a linear correlation is created. The set speed value is reduced linearly if the difference between the target position and the actual position decreases. If the difference is 0, the set speed value is also 0. Consequently a jolt-free retardation of the vehicle is realized.

One configuration of the invention relates to a computer-program product with program code, which has been stored on a computer-readable medium and is executable with the control unit, for carrying out the method according to one of the preceding embodiments for decelerating a vehicle moving at low speed by using a hydraulically or pneumatically operated braking system.

A further development of the invention relates to a vehicle, in particular a motor vehicle, with a computer-program product according to the configuration previously described.

The technical effects and advantages that can be obtained with the computer-program product as proposed and also with the vehicle as proposed correspond to those which have been discussed for the method as proposed. Summing up, let it be pointed out that the vehicle can be decelerated in jolt-free manner also at low speeds until it comes to a complete standstill, by using a hydraulically or pneumatically operated braking system. In addition, a repeated accelerating and decelerating of the vehicle is prevented.

Exemplary embodiments of the invention will be elucidated in more detail in the following with reference to the appended drawings. Shown are:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
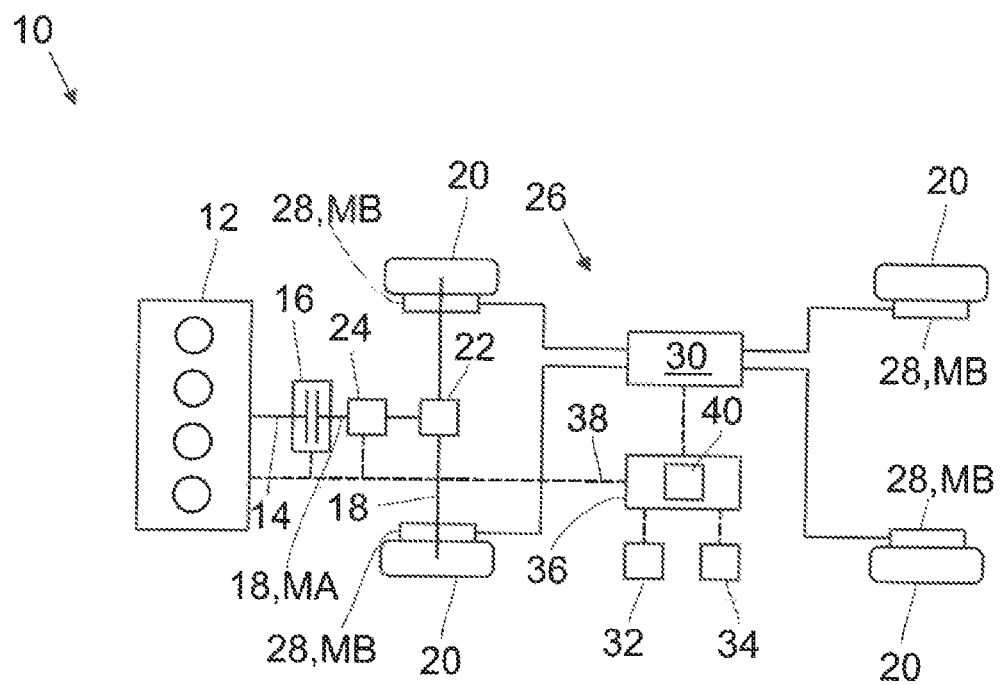
FIG. 1 is a diagrammatic top view of a vehicle that can be operated by means of a method as proposed.

FIG. 1 shows a diagrammatic top view of a vehicle 10 that can be operated with a method as proposed. The vehicle 10 has an engine 12, in this case an internal-combustion engine, which may also be realized as an electric motor. The engine 12 provides, via an engine output shaft 14, a certain engine torque which it passes on to a torque converter 16. The engine/motor 12, output shaft 14, and torque converter 16 may be referred to collectively as the powertrain of the vehicle. The torque converter 16 is connected to a drive train 18 with which a propulsion torque MA provided by the torque converter 16 can be distributed to a number of wheels 20. In the example represented, the vehicle 10 has four wheels 20, of which the front wheels are driven via the drive train 18. For this purpose the drive train 18 has appropriate differentials 22. The propulsion torque MA transmitted from the torque converter 16 to the drive train 18 can be registered by means of a torque sensor 24. But the provision of a torque sensor 24 is not necessary, since ordinarily the characteristics of the engine 12 and of the torque converter 16 are known, so that the propulsion torque MA transmitted from the torque converter 16 to the drive train 18 can be inferred solely via the speed of the engine 12. Nevertheless, the provision of the torque sensor 24 may be advantageous from the viewpoint of control engineering.

Moreover, the vehicle 10 includes a braking system 26 which is operated pneumatically and/or hydraulically. The braking system 26 has a brake unit 28 on each wheel 20, said brake units being in fluidic communication with a fluid reservoir 30 and capable of decelerating the wheels 20 with a braking torque MB. Over and above this, the vehicle 10 includes a speed sensor 32 which registers the speed of the vehicle 10 and generates corresponding speed signals. The speed sensor 32 may be realized as an incremental encoder which, as is well known in the art, generates a signal (or "tick") for each increment of angular rotation of the monitored. As us also well known, at low speeds it may occur that if the incremental encoder produces no speed signal for a certain time it will provide an indication of zero speed, even though the vehicle is actually still moving slowly. In addition, the vehicle 10 has a vehicle-position-finding system 34, with which the actual position of the vehicle 10 can be registered and compared with a target position which can be entered or which has been ascertained.

In addition, the vehicle 10 includes a control unit or controller 36 with which the propulsion torque MA transmitted to the drive train 18 and also the braking torque MB acting on the wheels 20 can be changed. The controller 36 in this case can take into consideration the speed signals of the speed sensor 32 and also the signals of the torque sensor 24 and of the vehicle-position-finding system 34, to which the controller 36 is connected via electrical lines 38. The controller 36 includes a PI controller 40—that is to say, a controller with a proportional term and with an integrating term. For the purpose of changing the propulsion torque MA, the controller 36 can activate the engine and/or the torque converter 16 appropriately. For the purpose of changing the braking torque MB, the braking system 26 is activated appropriately by the controller 36.

Figure 2:
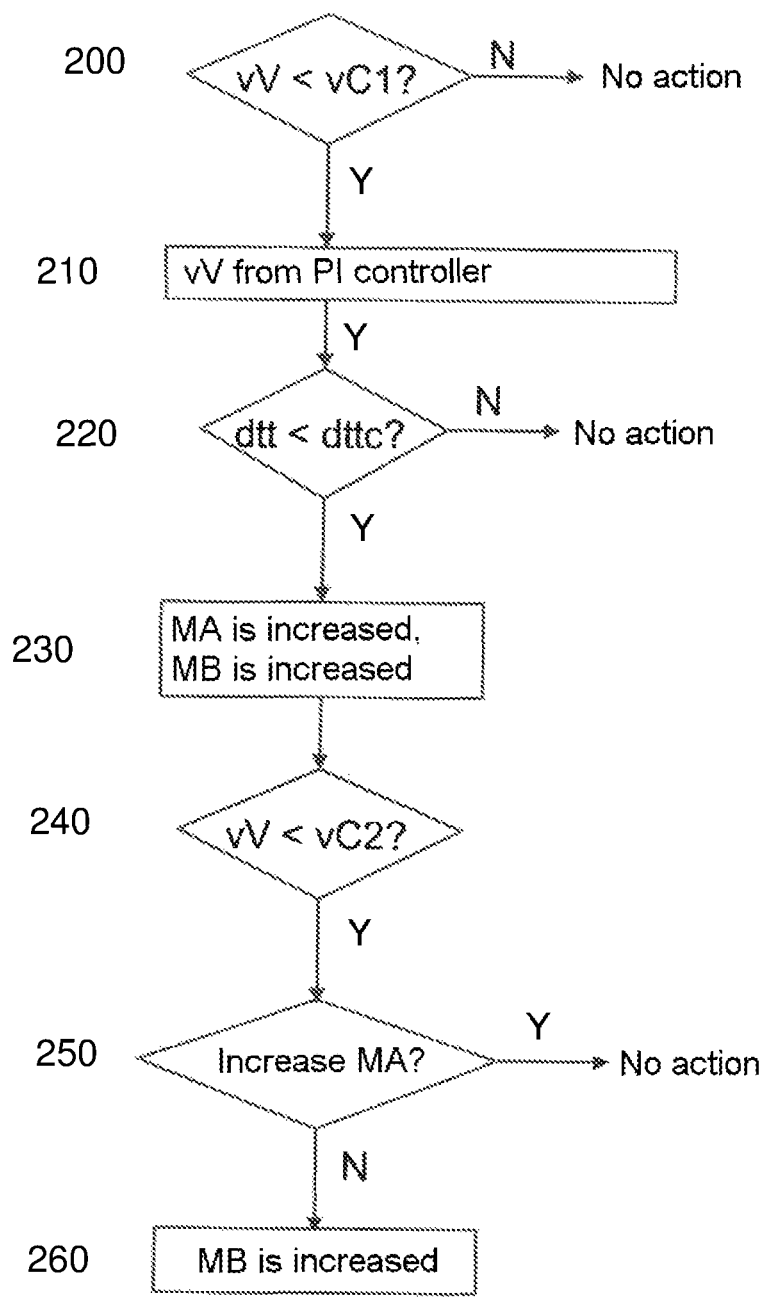
FIG. 2 is a flow chart of an embodiment of the method as proposed.

In FIG. 2 an embodiment of a method according to the invention, with which the vehicle speed vV can be regulated, is represented on the basis of a flow chart. Firstly, by means of the speed sensor 32 a check is made as to whether the vehicle speed vV falls short of a first limiting value vC1 (step 200). This first limiting value vC1 may amount to 6 km/h, for instance. If the vehicle 10 is moving more slowly than this limiting value vC1, the vehicle 10 has a so-called creeping speed. At (or below) the creeping speed, the vehicle speed vV is regulated with the PI controller 40 of the controller 36 (step 210).

In the next step, by means of the vehicle-position-finding system 34 the difference dtt (distance to travel) between the set value and the actual value of the position of the vehicle 10 is ascertained (step 220). The actual value can be ascertained by means of a GPS signal and/or by distance sensors (ultrasonic, radar, lidar, etc.). The set value can, for instance, be entered by the driver or determined by the controller 36, taking signals into consideration that are emitted by other vehicles or stationary infrastructure devices such as traffic signals or grade crossings. If the difference dtt between the set value and the actual value falls below a critical value dttc, the PI controller 40 causes both the propulsion torque MA transmitted from the drive train 18 and the braking torque MB to be increased (step 230). In this case the increase of the braking torque MB may also take 0 as its starting-point—that is to say, for the case where previously no braking torque MB was present.

If the vehicle speed vV falls below a second limiting value vC2 (step 240, "Yes"), which typically lies below the first limiting value vC1, a check is made as to whether there is a requirement for increasing the propulsion torque MA (step 250). A requirement may obtain, for instance, when a traffic signal jumps from red to green when the vehicle 10 is approaching and the vehicle 10 has not yet come to a halt and the driver or the controller 36 wishes to accelerate the vehicle. If there is no requirement for increasing the propulsion torque MA (step 250, "No"), the braking torque MB is increased further (step 260), so that the vehicle 10 now comes to a halt. No compensation of the actual position of the vehicle is undertaken if the difference dtt falls short of the critical value dttc but the difference does not amount to 0.

From this exemplary embodiment it can be seen that the braking torque MB is increased in two stages, whereas the propulsion torque MA is increased only once. In the first stage, the vehicle 10 is decelerated contrary to an increased propulsion torque MA, for which purpose a braking torque MB is necessary that lies above the minimal braking torque with which the hydraulically or pneumatically operated braking system being used can be actuated. If the vehicle speed vV has fallen below a second limiting value vC2, in the second stage the braking torque MB is increased once again, in order to ensure that the vehicle 10 is decelerated completely and, for instance, also remains stationary when the vehicle 10 is on a slope and/or a gust of wind takes hold of the vehicle 10. The second limiting value vC2 has been chosen in such a way that the braking torque MB which has then been increased again does not result in an abrupt decelerating.

Figure 3:
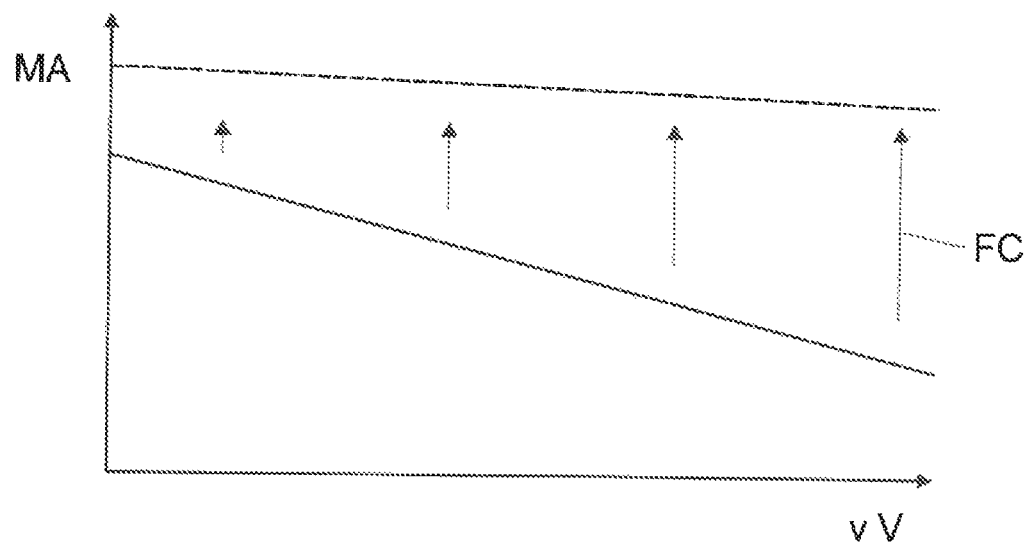
FIG. 3 is a schematic representation of the correlation between the propulsion torque transmitted from the drive train to the wheels and the speed of the vehicle.

In FIG. 3 the propulsion torque MA transmitted from the drive train 18 to the wheels 20 has been plotted over the vehicle speed vV, with the vehicle 10 moving at the creeping speed. The propulsion torque MA that is output from the drive train 18 is, amongst other things, dependent on the speed of rotation of the drive train 18, on the vehicle speed vV, and on the geometry of the torque converter 16. If the vehicle 10 is retarded in a given automatic gear and the wheels 20 rotate more slowly, the speed of rotation of the drive train 18 also falls. But the engine 12 has to run at least at the idling speed, with the consequence that the propulsion torque MA transmitted from the torque converter 16 to the drive train 18 rises.

In order to compensate for this effect, the increase of the propulsion torque MA is undertaken in a manner depending on the vehicle speed vV. Therefore the propulsion torque MA is increased more intensely at higher vehicle speeds vV than at lower vehicle speeds vV, so that after the compensation approximately the same propulsion torque MA is transmitted to the drive train 18. By virtue of this compensation, it is ensured that a certain braking torque MB can be provided largely independently of the vehicle speed vV, so that the vehicle 10 comes to a halt completely and in jolt-free manner. The compensation can be implemented with the aid of values saved in tables, and can be chosen in such a way that the propulsion torque MA transmitted to the drive train 18 after the compensation is big enough to overcome the drag losses of the drive train 18 and the friction of the wheels 20 on the ground, so that the vehicle 10 moves at the creeping speed if the engine 12 is turning at the idling speed.

But, as evident from FIG. 3, the compensation is not carried out in such a way that the compensated propulsion torque MA is independent of the speed of the vehicle. Rather, the compensation is undertaken only with a compensation factor FC which, for instance, lies within the range from 0.6 to 0.8. By this means, the dependence of the compensated propulsion torque MA on the vehicle speed vV is distinctly reduced, and an overcompensation is prevented which might lead to oscillations, as a result of which the vehicle 10 is repeatedly accelerated and retarded.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for autonomously stopping a wheeled vehicle at a target position comprising:
   operating a speed sensor to generate a speed signal indicating a speed of the vehicle;
   operating a position-finding system to determine a difference (dtt) between an actual position of the vehicle and the target position; and
   operating a controller in communication with the speed sensor and position-finding system to:
   a) when the vehicle speed falls below a creeping speed, institute a proportional-integral control to i) establish a set speed which decreases as the difference (dtt) decreases and ii) increase a propulsion torque and a braking torque to respective levels to achieve the set speed; and
   b) if the vehicle speed falls below a threshold lower than the creeping speed and the controller receives no demand for increased propulsion torque, further increasing the braking torque by an amount dictated by vehicle movement until the vehicle stops.

2. The method of claim 1, wherein the further increase in braking torque recited in b) comprises:
   increasing the braking torque by a defined value for each speed signal registered by the controller.

3. The method of claim 1, wherein the increase of the propulsion torque is performed by applying a compensation factor.

4. The method of claim 1, wherein the set speed is calculated from a quotient of the difference (dtt) and a scaling factor.

5. The method of claim 1, further comprising operating the controller as follows:
   after occurrence of step a), if the difference (dtt) falls below a limiting value and the speed sensor has not produced a speed signal for a certain time, setting a speed-error input value for an integrating term of the proportional-integral control to 1.

6. A method for autonomously stopping a wheeled vehicle at a target position comprising:
   operating a controller to:
   a) receive signals indicating a vehicle speed and a distance (dtt) of the vehicle from the target position;
   b) when the vehicle speed falls below a creeping speed, command a vehicle powertrain to increase a propulsion torque and command a vehicle braking system to increase a braking torque, the propulsion and braking torques being controlled to meet a set speed which decreases linearly as a difference (dtt) between an actual position of the vehicle and the target position decreases; and
   c) if the vehicle speed falls below a threshold lower than the creeping speed and the controller receives no demand for increased propulsion torque, further increase the braking torque by an amount proportional to vehicle movement until the vehicle stops.

7. The method of claim 6, wherein the controller institutes a proportional-integral control to establish the set speed.

8. The method of claim 7, wherein the controller receives the signals indicating vehicle speed from an incremental encoder, and the further increase in braking torque recited in c) comprises:
   increasing the braking torque by a defined value for each speed signal received from the encoder.

9. The method of claim 7, wherein the increase of the propulsion torque is performed by applying a compensation factor.

10. The method of claim 7, wherein the set speed is calculated from a quotient of the difference (dtt) and a scaling factor.

11. The method of claim 7, further comprising operating the controller to:
   after occurrence of step b), if the difference (dtt) falls below a limiting value and no speed signal is received for a certain time, set a speed-error input value for an integrating term of the proportional-integral control to 1.

12. A method comprising:
   determining a speed of a motor vehicle is below a first threshold;
   independently of a driver, increasing a propulsion torque and a braking torque delivered to vehicle wheels to decelerate the vehicle; and
   if the vehicle speed falls below a second threshold and no demand for increased propulsion torque exists, further increasing the braking torque by an amount proportional to wheel rotation until the vehicle stops.

13. The method of claim 12, wherein propulsion and braking torques are controlled by a controller which institutes a proportional-integral control to establish a set speed which decreases linearly as a difference (dtt) between an actual position of the vehicle and a target stopping position decreases.

14. The method of claim 13, wherein the controller receives signals indicating vehicle speed from an incremental encoder, and the further increase in braking torque comprises:
   increasing the braking torque by a defined value for each speed signal received from the encoder.

15. The method of claim 13, wherein the increase of the propulsion torque is performed by applying a compensation factor.

16. The method of claim 13, wherein the set speed is calculated from a quotient of the difference (dtt) and a scaling factor.

17. The method of claim 13, further comprising operating the controller to:
   if the difference (dtt) falls below a limiting value and no speed signal is received from an incremental encoder for a certain time, set a speed-error input value for an integrating term of the proportional-integral control to 1.

* * * * *